July 3, 1945. W. O. WATSON 2,379,505
FILM MARKING AND MARK INDICATING SYSTEM
Original Filed Dec. 27, 1940
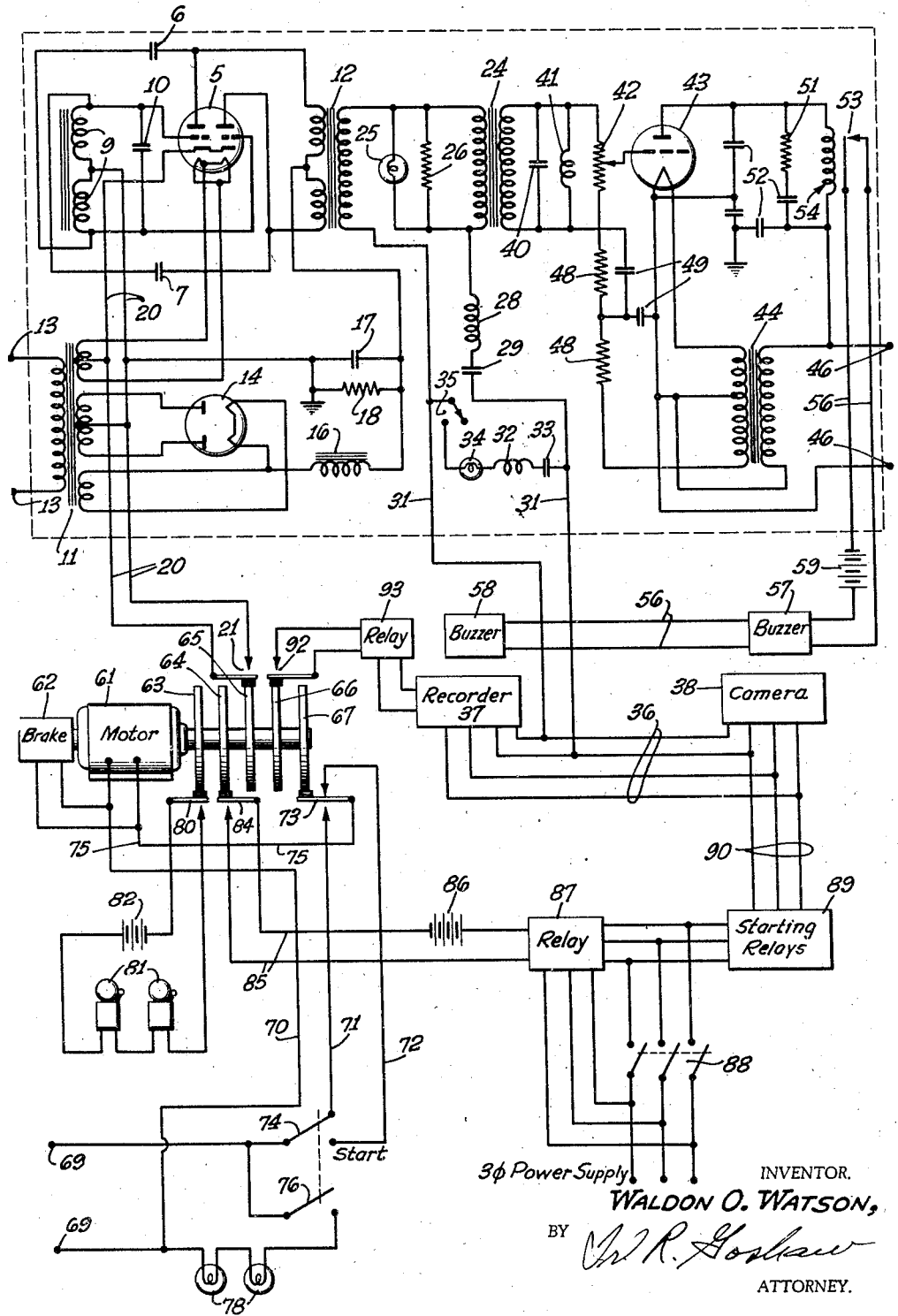
INVENTOR.
WALDON O. WATSON,
BY
ATTORNEY.

Patented July 3, 1945

2,379,505

UNITED STATES PATENT OFFICE 2,379,505

FILM MARKING AND MARK INDICATING SYSTEM

Waldon O. Watson, North Hollywood, Calif., assignor to Radio Corporation of America, a corporation of Delaware Original application December 27, 1940, Serial No. 371,982, now Patent No. 2,301,911, dated November 10, 1942. Divided and this application September 12, 1942, Serial No. 458,124

7 Claims. (Cl. 250—27)

This application is a division of application Serial No. 371,982, filed December 27, 1940, Patent No. 2,301,911, dated November 10, 1942, entitled "Control system for motion picture apparatus," in which the general control system is claimed, the present application being directed to the specific marking and mark indicating method and means.

This invention relates to motion picture apparatus and particularly to a system for controlling the starting and stopping cycles of motion picture cameras and sound recorders when operated simultaneously.

It is well known in the art of motion picture production that pictures are photographed at one location and the sound usually recorded at another location, the camera and projector being operated in synchronism at constant speed. Thus, the respective motors for the picture camera and sound recorder should be simultaneously started and operated in synchronism. Since one or more microphones are positioned about the set during the actual photographing of the scene, it is necessary that extraneous noises be eliminated near or in the vicinity of the microphones to prevent these noises from being recorded with the desired sounds. Thus, warning signals in the form of bells, red lights and wigwags are employed. To aid in combining the two films into the final composite print, it is common practice to mark both the picture and sound negatives at the beginning and/or end of the "take." This was formerly accomplished by the use of a clapperstick, although simultaneous light impulses have also been used.

The present invention is directed to a system for controlling the sequence of operation of the various warning lights and bells, the starting of the camera and recorder and the application of the synchronizing marks to the respective negatives. In the past, the warning bells, red lights and wigwags were manually operated, the operator generally being a stageman who, on a verbal signal from an assistant director, would operate the control switches located on the sound stage. In addition to this stageman, additional whistle men were stationed outside the stage in the passageways or in adjoining streets to blow a warning whistle to halt pedestrian or motor traffic.

Thus, in shooting a scene, the usual past procedure was that, as soon as a director gave the order to make a take, the stageman rang the warning bell once for about two seconds and switched on the red lights and wigwags. The mixer then transmitted the start signal to the recording operator by an intercommunication buzzer. The recording operator then threw his master switch, which started the recorder and camera motors and, as soon as the film loops had properly formed to insure constant uniform speed, the recording operator buzzed the go-ahead signal to the mixer on the picture scene. The mixer then informed an assistant that the films had reached constant uniform speed, and an assistant would hold the clapperstick in front of the camera and bring them together with a sharp sound to produce the synchronizing marks. The director then ordered the action to start.

At the end of a take, the director would order "cut" and the mixer buzzed the recorders, who switched off the motors. The stageman then rang the warning bells twice and switched off the red lights and wigwags, and the whistle men blew their whistles twice. The recording operator would then run the recorders at the end of each roll of film for about five feet to expose a density test. Since each of these operations was manually controlled, considerable time was required to make a take. Also, since each operation depended upon an operator, many violations occurred, resulting in numerous sound scenes being spoiled by extraneous noises or errors.

The present system, in addition to furnishing positive control of signal, starting, marker and test devices, has eliminated the work of switch control men on the stages or on location, and also the whistle men who supplemented the warning lights. The present system automatically controls all these operations, the starting cycle being listed, in the order of the occurrence of the operations, as follows:

(1) Warning red lights turned on,
(2) One warning bell sounds,
(3) Recorder and camera motors started,
(4) Synchronizing marks applied to the recorder and camera films.

At the end of a take, the following operations are automatically brought about, some of which occur simultaneously:

(1) The warning red lights are turned off,
(2) Two warning bells are sounded,
(3) Density test is exposed on the recorder film,
(4) Synchronizing marks are applied to the recorder and camera films,
(5) The sound recorder and camera motors are stopped.

The principal object of the invention, therefore, is to facilitate the taking of a motion picture and the recording of the concomitant sound therefor.

Another object of the invention is to control automatically the series of operations required for photographing a motion picture scene and recording the sound therefor.

A further object of the invention is to provide means for applying synchronizing marks to film negatives in the photographing of a motion picture scene and in the recording of the sound therefor.

A further object of the invention is to generate an alternating current marking signal which controls a signal for indicating the satisfactory application of the marking signal.

Although the novel features which are believed to be characteristic of this invention will be pointed out with particularity in the appended claims, the manner of its organization and the mode of its operation will be better understood by referring to the following description read in conjunction with the accompanying drawing forming a part thereof in which the single figure is a combination schematic and diagrammatic drawing embodying the invention.

Referring now to the drawing, the upper portion of the circuit shown within the dotted lines comprises an oscillator and thyratron circuit employed for generating marking currents and signal currents for indicating that the marking system has operated. The oscillator comprises a double triode tube 5, the plates of which are fed back through condensers 6 and 7 to the grids in the opposite triode sections. The grids are tuned to 2000 cycles by the parallel resonance circuit comprising inductances 9 and a condenser 10. The output of the two plates of the tube 5 is fed to the primary of an output transformer 12.

The oscillator is supplied with power through a rectifier unit including a power transformer 11, the primary of which is connected to a source of 110-volt alternating current at terminals 13, and a full-wave rectifier tube 14. The output of the rectifier is filtered through an inductance 16 and condenser 17, the latter of which is shunted by a bleeder resistance 18, the bleeder resistance preventing excessive voltage across the condenser 17 during the time the oscillator grid-cathode circuit is open. It will be noted that the grid-cathode circuit is connected over conductors 20 to contact switch 21, the closing of the switch 21 starting the oscillator in operation.

The secondary of the output transformer 12 is connected through the primary of a coupling transformer 24 over a network composed of a ballast lamp 25 and a fixed resistor 26, this network being provided to produce a voltage differential sufficient to operate the thyratron with a three-marker unit load but not with a two-marker unit load, as will be explained hereinafter. Connected in series with the respective secondary and primary terminals of transformers 12 and 24 is a series resonance circuit composed of inductance 28 and a condenser 29 which is so designed as to have minimum insertion loss at 2000 cycles and maximum insertion loss at 60 cycles, thus preventing the sixty-cycle power from operating the thyratron. Connected in shunt across conductors 31 is a series resonance circuit comprised of an inductance 32, a condenser 33, and a marking lamp 34, which may be connected in and out of circuit by a switch 35. This lamp circuit is a duplicate of the marking units employed in the camera and recorder, is tuned to 2000 cycles, and is disconnected only when three marking units are being used, such as during the operation of two cameras and a recorder.

It will be noted that conductors 31 are connected to two wires of a four-wire cable 36 interconnecting a sound recorder 37 and a picture camera 38. One of these conductors is a ground wire required for protective purposes and is also employed in other cables, while the second conductor for the marking currents is one of the main conductors of the three-phase power supply system. Since the oscillator is supplying a 2000-cycle current, this method of transmitting the marking current has been found satisfactory and economical.

As mentioned above, a shunt circuit similar to the unit comprising elements 32, 33 and 34 is employed in the recorder 37 and camera 38. Upon impression of the 2000-cycle current, the lamps corresponding to lamp 34 are energized and the respective films are fogged. All these marking lamp circuits are designed to attenuate the sixty cycle from the three-phase supply line to the lamp, while having a minimum attenuation to the 2000-cycle current. Thus, it will be obvious that the closing of contact 21, which starts the oscillator 5 into operation, will impress a 2000-cycle current upon the recorder and camera energizing the respective fogging lamps thereof.

The three marking lamps, namely, lamp 34 and the ones (not shown) in the recorder and camera, are normally connected in the circuit. Now, in accordance with the amount of current drawn by these three circuits, the resistance of resistor 26 is adjusted so that the current through lamp 25 is at a point on the temperature-resistance characteristic where the resistance change is rapid for a decrease in the current through the lamp. This adjustment produces sufficient voltage across the secondary of transformer 24 to operate the thyratron. Now, should one of the marker lamps burn out, the decrease in current through lamp 25 is accompanied by a large drop in voltage across the lamp, this voltage reaching a point below which the thyratron will operate. Thus, the network 25—26 controls the voltage to the thyratron so that it will operate with three marking lamps in circuit but not when only two are functioning.

Referring now to the right-hand portion of the circuit within the dotted lines, there is shown a thyratron relay tube 43, connected to the step-up transformer 24. The secondary of the transformer 24 is tuned to 2000 cycles by a parallel resonance circuit consisting of a condenser 40 and an inductance 41. A potentiometer 42 is provided for adjusting the operating limits of the thyratron tube 43 in conjunction with network 25—26. The thyratron portion of the circuit is supplied with power through a transformer 44, the primary of which is connected to a 110-volt sixty-cycle source at terminals 46. This transformer 44 supplies a filament voltage and a bias voltage to the thyratron tube 43. The bias voltage is out of phase with the 110-volt sixty cycle A. C. delivered to the plate of the thyratron, this bias being adjusted to a point below the igniting point. The bias voltage is fed to the grid of the tube 43 through a delay network composed of resistances 48 and condensers 49. This timing circuit increases the duration of the firing time and prevents the thyratron from firing for one cycle only. Connected in the plate circuit of the thyratron 43 is a network comprised of a resistance 51 and a plurality of condensers 52, this network preventing chattering of the contacts 53 of a relay 54. The contacts of relay 53 are connected to conductors 56 which are connected to a buzzer 57 at the camera, and a buzzer 58 at the recorder, energized through a source of power such as a battery 59.

The operation of the above described portion of the system is that, upon the closure of the contact 21, the oscillator begins generating 2000-cycle current which is impressed upon the recorder and camera marking or fogging lamps and lamp 34. If all of these lamps are operating, then the proper voltage will be supplied to thyratron 43 to ignite it, causing the relay 54 to be energized, closing contact 53, which energizes buzzers 57 and 58 to indicate that the marking lamps have been energized.

Referring now to the lower portion of the system, a motor such as a simple clock motor 61, has a brake 62 and is adapted to drive a plurality of cams 63, 64, 65, 66 and 67. This motor may be supplied with energy from either a D. C. or A. C. source connected to terminals 69. The power supply circuit from terminals 69 is over a three-wire circuit composed of conductors 70, 71 and 72. The blade 74 of a three-way switch controls the starting of the motor 61, while the position of the swinger of switch 73, operated by cam 67, controls the stopping of the motor. Thus, the throwing of the switch blade 74 to the lower contact position will start the motor 61 when the swinger of switch 73 is in its upper position as shown in the drawing, the energy supply circuit being over blade 73, conductor 72, conductor 75, the motor and conductor 70. Simultaneously with the energizing of the motor 61, the brake 62 is energized, which releases it. Now, should the swinger of switch 73 be moved to its lower contact by the cam 67, the motor will be deenergized but may be started again by throwing the switch blade 74 to its upper contact.

Simultaneously with the operation of the switch 74, blade 76 is actuated, the lower position of which will energize a plurality of lamps or wigwags 78. That is, the lamps 78 indicate red warning lights which may be positioned at the doors of stages or other places to indicate that a scene is being photographed, or they may represent moving wigwags or signals which may be positioned in the streets about a stage to stop pedestrians or motor traffic. Thus, the swinging of the switch blades 74—76 to their lower position to start a "take" will start the motor 61 and simultaneously turn on the signal lights 78, while the throwing of these blades to their upper position will extinguish the lights 78 and will start the stopping cycle of the motor 61, as will be explained.

The rotation of the motor 61, as mentioned before, starts a series of operations. Cam 63, operates a contact 80 which energizes a plurality of signal bells 81 through an energy source 82. These bells are positioned on the set or in other locations to serve notice of the beginning or end of a take. Cam 64 operates a contact 84 which is connected over conductors 85 through an energy supply 86 to a relay 87. It will be noted that relay 87 shunts a manual three-phase switch 88 connected to the main three-phase power supply for the recorder 37 and camera 38. Both the relay 87 and the manual switch 88 are connected to a group of starting relays 89 which in turn are connected over conductors 90 to the camera and recorder. The starting relay system 89 is similar to that disclosed and claimed in Patent No. 2,282,957, issued May 12, 1942. Thus, the closing of contact 84 will energize relay 87 and impress the three-phase power upon the starting relays 89, which will start the recorder and camera, as disclosed in the above mentioned patent.

Cam 65 operates contact 21, and, as explained above, will produce fog marks on the negatives in the respective recorder and camera and indicate that such marks have been made. Cam 66 will operate contact 92, which energizes relay 93 for the purpose of increasing the light exposure on the sound negative, which may be accomplished in various ways, such as by removing the galvanometer bias from the noise reduction shutters or by tilting the galvanometer itself. This operation occurs at the end of a take for the purpose of exposing a density test strip for the sound negative.

To indicate the relative action of the five cams and the sequence of operation of the contacts actuated thereby, it is assumed that switch 74—76 is thrown to its lower position. This action energizes the signal lamps or wigwags 78 and the motor 61 which rotates the cams, the first contact to be made being 80, which will energize the bells 81. These bells will ring once for approximately two seconds to indicate the beginning of a "take," at the end of which time contact 84 is closed to energize relay 87 to start the recorder and camera motors. At about one hundred twenty-three degrees of rotation, or approximately three seconds, the motors are up to speed, and cam 65 closes contact 21 to operate the oscillator to provide synchronizing marks on the respective negatives. If the marker circuit has properly operated, the relay contact 53 will close and the buzzers 57 and 58 sounded to indicate that the films have been marked. At the completion of the buzzer cycle, the upper contact of switch 73 is broken and the motor 61 and the cams are stopped. However, even through the brake 62 is applied, the inertia of the rotating elements will rotate the cams over the coasting section of six degrees, which causes the lower contact of switch 73 to be made. After the buzzer signal, the action begins before the camera, and the scene is photographed.

At the order from the director to "cut," the switch 74—76 is manually thrown to its upper position and the motor 61 is started, which again starts the cams rotating. The throwing of the switch 74—76 to its upper position also breaks the warning light and wigwag signals. Further rotation of the cams, however, operates switch 80 twice, thus ringing the bells 81 twice to indicate the end of the "take." The recorder and camera motors remain energized over a period of twenty-one degrees, over which period the contact 21 is closed to again mark the respective negatives in the recorder and camera. Simultaneously, the contact 92 is closed, actuating relay 93 and increasing the exposure on the sound negative for a density test. As the cams continue to rotate, all the circuits are deenergized except the motor circuit to the motor 61, which continues to operate until it completes one revolution, at which time the lower contact 73 is broken and the motor is stopped. The motor and cams coast sufficiently to close the upper contact of switch 73, readying the apparatus for the next "take."

Thus, from the above, it is apparent that it is only necessary for an operator to operate one switch such as 74—76 to initiate a sequence of operations which formerly required several manual operations with a corresponding number of operators. Furthermore, the sequence of operations is uniform and dependable, there being no opportunity for manual errors to be injected in the system. The synchronizing marks are always placed at a certain position on the film where the cutters or editors know where to look for them. Also, the marking circuit is automatic to the extent that, unless the films are properly marked, the go-ahead buzzer signal will not be given. Thus, this automatic starting and stopping system for picture cameras and sound recorders has materially reduced the time required to photograph a scene and record the sound thereof and has produced a higher average of good takes than was formerly obtainable with past methods and systems.

What I claim as my invention is:

1. A system for marking a plurality of motion picture films comprising an oscillator, a thyratron tube, a circuit for interconnecting the output of said oscillator to the input of said thyratron, a plurality of lamps connected to said interconnecting circuit, tuning means in said interconnecting circuit for tuning said circuit to the frequency of the output current of said oscillator, the current through all of said lamps generating an input voltage to said thyratron sufficient to ignite it, and means intermediate said oscillator and said thyratron for reducing the input voltage to said thyratron below the igniting point when one of said lamps is eliminated, said tuning means preventing said thyratron from being ignited by currents of certain other frequencies introduced into said interconnecting circuit.

2. A system for generating electrical oscillations comprising an electronic oscillator tube, means for supplying power to said tube for generating oscillations of a relatively higher frequency than the frequency of said power supply, a thyratron tube, a circuit interconnecting the output circuit of said oscillator with the input circuit to said thyratron, a load circuit connected in series with said interconnecting circuit, said load circuit including a plurality of lamps said load circuit being tuned to the frequency of said generated oscillations to prevent said thyratron from being ignited by said power frequency currents, and means in said interconnecting circuit for generating a voltage across the input circuit of said thyratron tube when all of said lamps are energized sufficient to ignite said thyratron, said means reducing the voltage across said thyratron below the igniting point when one of said lamps is removed from said output circuit.

3. A system comprising an oscillator, a thyratron, an interconnecting circuit between said oscillator and said thyratron, a variable load, means for tuning said load to the frequency of said oscillator, means for connecting said load and said tuning means in said interconnecting circuit, and means in said interconnecting circuit for predetermining the amount of said load which will ignite said thyratron, the tuning of said load preventing currents of other frequencies than said oscillator frequency from igniting said thyratron.

4. A system in accordance with claim 3 in which said load comprises a plurality of lamps, the amount of said load being predetermined by the number of lamps connected to said interconnecting circuit.

5. A system in accordance with claim 3 in which said igniting predetermining means includes a resistance and ballast lamp in shunt to said interconnecting circuit.

6. A system comprising an electrical current oscillator, for generating currents of a definite frequency, a thyratron, an interconnecting circuit between the output of said oscillator and the input to said thyratron, said interconnecting circuit having currents of other frequencies introduced therein, a plurality of load circuits connected in series-parallel in said interconnecting circuit, means for tuning said interconnecting circuit and said load circuits to the frequency of the currents generated by said oscillator, and means for causing the ignition of said thyratron upon a predetermined reduction in the number of said load circuits.

7. A system in accordance with claim 6 in which said last mentioned means includes a fixed resistance and a resistance variable with temperature connected in said interconnecting circuit.

WALDON O. WATSON.